United States Patent [19]

Iguchi et al.

[11] 4,272,805
[45] Jun. 9, 1981

[54] SWITCHING REGULATOR PROVIDED WITH CHARGE-DISCHARGE CIRCUIT HAVING OVERCURRENT PROTECTING FUNCTION AND SOFT-START FUNCTION

[75] Inventors: Yasuhide Iguchi, Tsurugashima; Tsutomu Koike, Higa-shimatsuyama, both of Japan

[73] Assignee: Toko, Inc., Tokyo, Japan

[21] Appl. No.: 66,428

[22] Filed: Aug. 13, 1979

[30] Foreign Application Priority Data

Aug. 25, 1978 [JP] Japan .................. 53-103595

[51] Int. Cl.³ .......................... H02M 3/335
[52] U.S. Cl. .................. 363/19; 363/49; 363/56
[58] Field of Search ....... 307/296 A; 323/17, DIG. 1; 363/18-21, 49, 124, 56

[56] References Cited

U.S. PATENT DOCUMENTS

| Re. 29,510 | 1/1978 | Hull | 363/21 |
|---|---|---|---|
| 4,121,282 | 10/1978 | Ohsawa | 363/124 X |
| 4,130,862 | 12/1978 | Holt | 363/49 X |

FOREIGN PATENT DOCUMENTS 532943  2/1977  U.S.S.R. ..................... 363/19

Primary Examiner—A.D. Pellinen
Attorney, Agent, or Firm—Schwartz, Jeffery, Schwaab, Mack, Blumenthal & Koch

[57] ABSTRACT

A switching regulator in which an input DC voltage is chopped and then applied to drive a transformer from which an AC voltage is derived which in turn is rectified in a rectifier circuit, and the output of the rectifier circuit is compared with a first reference voltage so that an output is provided which corresponds to the difference between the two voltages compared with each other and which causes a current to be charged at a capacitor incorporated in a charge-discharge circuit which is arranged to vary the charged current, and the output of the charge-discharge circuit is compared with a second reference voltage so that a trigger signal is produced and applied to the base of a switching transistor only when the output of the charge-discharge circuit exceeds the second reference voltage.

2 Claims, 8 Drawing Figures

SWITCHING REGULATOR PROVIDED WITH CHARGE-DISCHARGE CIRCUIT HAVING OVERCURRENT PROTECTING FUNCTION AND SOFT-START FUNCTION

This invention relates to a switching regulator which is capable of providing a stabilized output voltage by means of pulse width modulation, achieving an improved power conversion efficiency and performing the function of overcurrent protection.

In the conventional switching regulators, use has been made of a system wherein a control signal for a switching element is produced by amplifying the difference between output voltage and reference voltage. Disadvantageously, however, the circuit arrangement usually becomes complex in order that the control signal may have a sufficient response speed and power to effect the intended control. In the case of a ringing choke type switching regulator, it often happens that the oscillation operation becomes unstable if the closed loop gain is increased, due to the fact that there occurs a phase difference between the "on" period of the switching element and the period during which output is generated.

Accordingly, it is an object of the present invention to provide a switching regulator which is excellent in terms of power conversion efficiency, is capable of providing overcurrent protection without any special overcurrent protection circuit incorporated therein, and in addition, is able to perform "soft start" function, thereby eliminating the aforementioned drawbacks of the conventional switching regulators.

In accordance with one aspect of the present invention, there is provided a switching regulator comprising an oscillator circuit for chopping a DC voltage supplied from an input power source to thereby drive a transformer; a rectifier circuit for rectifying an AC output voltage derived from the transformer; an error amplifier circuit for comparing a DC output voltage derived from the rectifier circuit with a first reference voltage to provide an output corresponding to the deviation of the DC output voltage from the first reference voltage; a charge-discharge circuit for varying a current which is charged onto a capacitor by the output of the error amplifier circuit; and a control circuit for comparing the output voltage of the charge-discharge circuit with a second reference voltage and for applying to the base of a switching transistor a trigger signal for causing the oscillation operation to be switched from the "on" state to the "off" state only when the output voltage of the charge-discharge circuit exceeds the second reference voltage.

Other objects, features and advantages of the present invention will become apparent from the following description taken in conjunction with the accompanying drawings.

Figure 1:
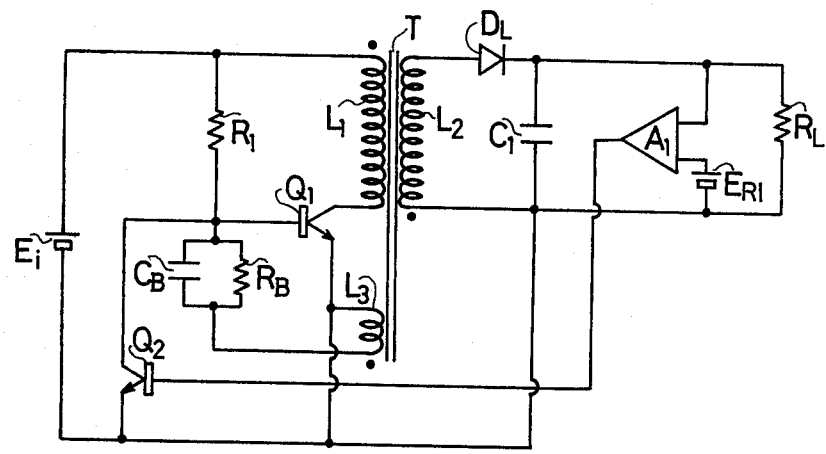
FIG. 1 is a circuit diagram showing an example of the prior-art switching regulator.

In order to give better understanding of the present invention, description will first be made of the conventional switching regulator of the blocking oscillator type such as shown in FIG. 1.

In such a circuit, the switching operation of a switching transistor $Q_1$ is performed by virtue of the saturation of collector current $i_{c1}$ flowing therethrough. As is known in the art, however, the collector current saturation characteristic of a transistor tends to be deteriorated with increase in the collector current. Thus, when it is attempted to obtain a great output with such circuit arrangement as shown in FIG. 1, a switching loss of a magnitude which cannot be neglected tends to occur during the time when the transistor $Q_1$ is switched from the "on" state to the "off" state, whereby the power conversion efficiency of this circuit is deteriorated.

Moreover, in such a conventional switching regulator, an overcurrent protecting circuit is separately provided, thus resulting in the circuit arrangement being further complicated. Furthermore, it has often been the case that such an overcurrent protecting circuit is of the type wherein a current detecting element such as resistor or the like is employed to detect output current, thereby protecting the switching regulator from overcurrent. Thus, with such a protecting circuit incorporated in the switching regulator, power loss in the current detecting element is also great, which in turn leads to decrease in the power conversion efficiency of the switching regulator.

Figure 2:
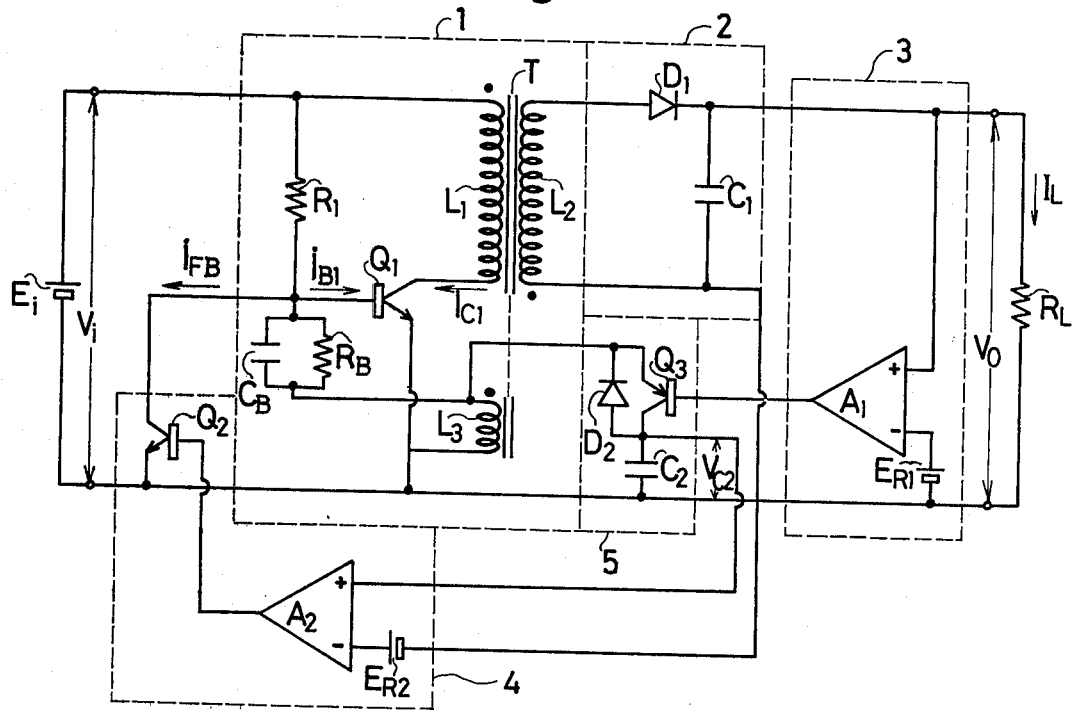
FIG. 2 is a circuit diagram showing the switching regulator according to an embodiment of the present invention.

Referring now to FIG. 2, there is shown an embodiment of the present invention, which includes a blocking oscillator circuit 1 comprising a starter resistor $R_1$, switching transistor $Q_1$, base resistor $R_B$, base capacitor $C_B$, and power transformer T including a primary winding $L_1$, secondary winding $L_2$ and feedback winding $L_3$; an output rectifier circuit 2 comprising a rectifier diode $D_1$ and smoothing capacitor $C_1$; and error amplifier circuit 3 comprising an amplifier $A_1$ provided with a first reference power source $E_{R1}$; a control circuit 4 comprising an amplifier $A_2$ provided with a second reference power source $E_{R2}$; and a charge-discharge circuit 5 comprising a transistor $Q_3$ and capacitor $C_2$ which are connected in series with the feedback winding $L_3$ of the aforementioned power transformer T, and a diode $D_2$ connected in parallel between the collector and the emitter of the transistor $Q_3$.

The operation of the main circuit of the switching regulator constructed as mentioned just above is well known, and therefore, any further description thereof will be omitted.

Figure 3:
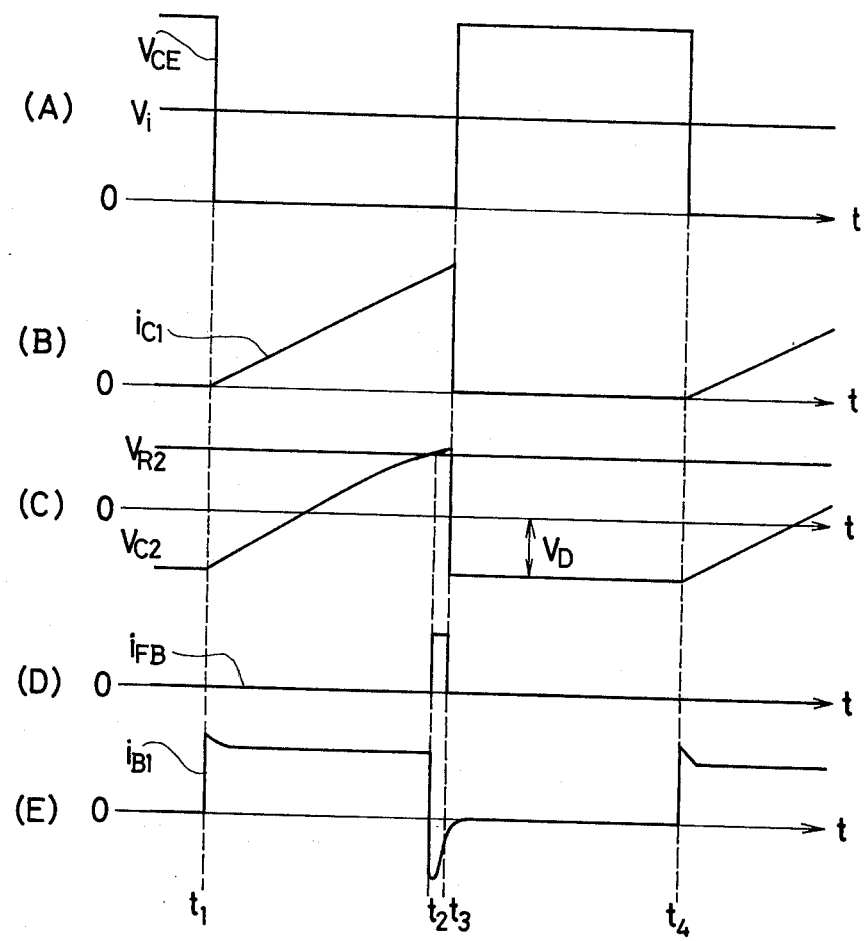
FIG. 3 is a view illustrating the operating voltage and current waveforms which occur in the respective portions of the circuit shown in FIG. 2.

Referring to FIG. 3, there are illustrated the operating current and voltage waveforms which occur in the respective portions of the circuit shown in FIG. 2. FIG. 3(A) shows the waveform of the collector-emitter voltage $V_{CE}$ of the switching transistor $Q_1$; FIG. 3(B) shows the waveform of the collector current $i_{c1}$ of the switching transistor $Q_1$; FIG. 3(C) shows the waveform of the output voltage $V_{C2}$ of the charge-discharge circuit 5 and the waveform of the reference voltage $V_{R2}$ in the control circuit 4; FIG. 3(D) shows the waveform of the collector current $i_{FB}$ of the control transistor $Q_2$ in the control circuit 4; and FIG. 3(E) shows the waveform of the base current $i_{B1}$ of the switching transistor $Q_1$.

Description will first be made of the operation of the circuit when the output voltage thereof is stabilized.

With the circuit of FIG. 2, the output of a DC power source $E_i$ provided therein is chopped through the switching operation of the switching transistor $Q_1$ so that there is produced such a collector-emitter voltage $V_{CE}$ as shown in FIG. 3(A), and the primary winding $L_1$ of the power transformer T is energized through the on-off operation of the transistor $Q_1$ so that an output voltage $V_0$ is obtained across a load resistor $R_L$. In the error amplifier circuit 3, the output voltage $V_0$ thus obtained is compared with the voltage $V_{R1}$ of the reference power source $E_{R1}$ by means of the amplifier $A_1$; thus, the deviation of $V_0$ from $V_{R1}$ results in an output which in turn is imparted to the base of the transistor $Q_3$ of the charge-discharge circuit 5. Subsequently, in the control circuit 4, the output $V_{C2}$ of the charge-discharge circuit 5 is compared with the voltage $V_{R2}$ of the reference power source $E_{R2}$ by means of the amplifier $A_2$; thus, the deviation of $V_{C2}$ from $V_{R2}$ results in an output which in turn is imparted to the base of the control transistor $Q_2$. In this way, the oscillation operation of the blocking oscillator circuit 1 is controlled by the output of the control circuit 4, whereby the voltage $V_0$ obtained across the load $R_L$ is provided as a stabilized output voltage $V_{OS}$.

The foregoing operation will be described below in greater detail. When the switching transistor $Q_1$ is turned on at a point of time $t_1$, a current which increases with time as shown in FIG. 3(B) will be caused to flow through the primary winding $L_1$ of the power transformer T so that a voltage will be induced in the feedback winding $L_3$. At the same time, in the charge-discharge circuit 5, the capacitor $C_2$ will begin to be charged with the voltage thus induced in the feedback winding $L_3$, through the transistor $Q_3$. In this case, the transistor $Q_3$ operates as a variable resistance element which is controlled by the output of the error amplifier circuit 3 which is arranged to operate in accordance with the output voltage $V_0$, thus causing the voltage charged at the capacitor $C_2$ to be gradually increased from the point of time $t_1$. In the control circuit 4, the output $V_{C2}$ of the charge-discharge circuit 5 will always be compared with the voltage $V_{R2}$ of the reference power source $E_{R2}$ and only after a point of time $t_2$ when the output $V_{C2}$ of the charge-discharge circuit 5 exceeds the reference voltage $V_{R2}$, the control transistor $Q_2$ will be provided with a base current from the output of the amplifier $A_2$. Thus, the control transistor $Q_2$ will be rendered conductive during the period from the point of time $t_2$ to a point of time $t_3$ so that the base current $i_{B1}$ which has been rendering the transistor $Q_1$ conductive will now be caused to flow as the collector current $i_{FB}$ of the control transistor $Q_2$; thus, not only all the base current but also the accumulated carrier of the switching transistor $Q_1$ will be absorbed so that there will be provided such a control signal $i_{FB}$ as shown in FIG. 3(D). In this way, the base current $i_{B1}$ of the switching transistor $Q_1$ will be caused to take such a waveform as shown in FIG. 3(E). At the point of time $t_3$ when the switching transistor $Q_1$ is turned off, a voltage which is negative, i.e., reverse in polarity to the positive voltage produced during the conduction of the switching transistor $Q_1$, will be produced in the feedback winding $L_3$ of the power transformer T. Thus, the diode $D_2$ of the charge-discharge circuit 5 will cause the voltage charged at the capacitor $C_2$ to be discharged during the period of time from $t_3$ to $t_4$ during which flyback energy will be discharged from the power transformer T. Further, the diode $D_2$ will act to cause the capacitor $C_2$ to be charged with a negative voltage $V_D$. Consequently, the output $V_{C2}$ of the charge-discharge circuit 5 will be made to have such a voltage waveform as shown in FIG. 3(C).

As will be appreciated from the foregoing explanation, according to the present invention, the base current $i_{B1}$ of the switching transistor $Q_1$ can be quickly interrupted so that high-speed switching operation of the transistor $Q_1$ can be achieved. In this way, according to the present invention, it is possible to reduce the switching loss of the switching transistor $Q_1$, thus resulting in an enhanced power conversion efficiency.

The output voltage $V_0$ tends to vary with variations in input and load, but according to the present invention, both the output of the error amplifier 3 and the operating resistance of the transistor $Q_3$ acting as variable resistance element are varied with the afore-mentioned variations in input and load so that the period of time from $t_1$ to $t_2$ during which the output $V_{C2}$ of the charge-discharge circuit 5 reaches the level of the reference voltage $V_{R2}$ can be changed. With the circuit of FIG. 2, the operating resistance of the transistor $Q_3$ is increased with decrease in the output voltage $V_0$, and as a result, the period of time from $t_1$ to $t_2$ shown in FIG. 3 is increased so that the energy accumulated in the power transformer T is increased, thus resulting in the output voltage $V_0$ being increased. More specifically, according to the present invention, the "on" period of the transistor $Q_1$ in the blocking oscillator circuit 1 can be controlled so that the output voltage $V_0$ produced across the load $R_L$ can be provided as stabilized output voltage $V_{OS}$.

A further noteworthy feature of the present invention resides in the fact that the operation can be highly stabilized with respect to external noise. As mentioned above, the operation for enabling the switching transistor $Q_1$ to be switched from the "on" state to the "off" state is performed when the output $V_{C2}$ of the charge-discharege circuit 5 exceeds the voltage $V_{R2}$ of the reference power source $E_{R2}$ in the control circuit 4. By setting up the aforementioned voltage $V_{R2}$ to be high relative to external noise, therefore, it is possible to prevent the switching operation of the switching transistor $Q_1$ from being affected by external noise. In this case, the voltage $V_{R2}$ always remains unchanged irrespective of variations in the load. Thus, the operation of the present circuit is stabilized, without being adversely affected by external noise, over the entire load range from light load to heavy load.

Description will next be made of the circuit operation which occurs with an overcurrent.

Figure 4:
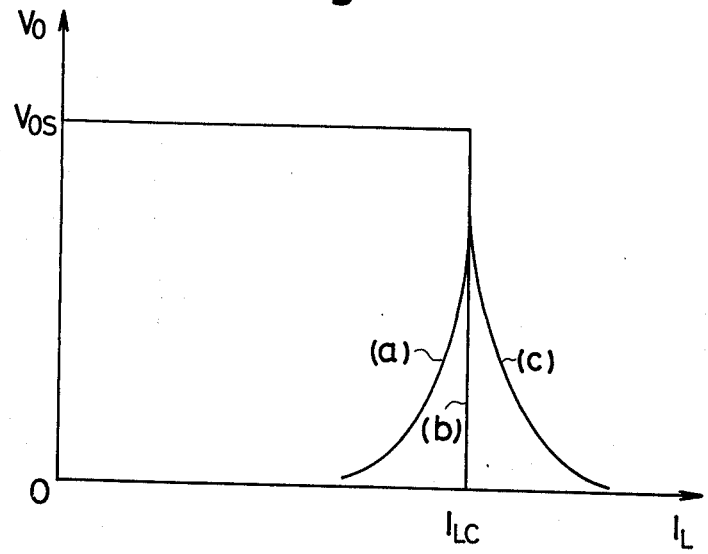
FIG. 4 is a view illustrating the overcurrent protection characteristic of the circuit shown in FIG. 2.

In a steady state, according to the present invention, with decrease in the output voltage $V_O$ which results from increase in the load, the operating resistance of the transistor $Q_3$ in the charge-discharge circuit 5 is increased by the output of the error amplifier 3, and the "on" period of the switching transistor is increased, thus resulting in the output voltage $V_O$ becoming stabilized. According to the present invention, therefore, by suitably selecting the maximum value of the operating resistance of the transistor $Q_2$ in the control circuit 4, it is possible to determine the maximum value of the "on" period of the switching transistor $Q_1$. In this way, according to the present invention, when the load requires an output which is higher than the present maximum output, i.e., when there occurs overcurrent state, the stabilizing action is eliminated so that the output voltage $V_O$ can be decreased. Furthermore, the voltage $V_D$ for discharging the capacitor $C_2$ in the charge-discharge circuit 5 is proportional to the output voltage $V_O$ produced across the load $R_L$, and therefore it also decreases with decrease in the output voltage $V_O$. As will also be appreciated from the voltage waveform shown in FIG. 3(C), according to the present invention, the "on" period of the switching transistor can be quickly reduced upon occurrence of an overcurrent state. Still furthermore, it is possible to change the extent to which the "on" period of the switching transistor $Q_1$ is reduced, by selecting the relationship between the voltage $V_{R2}$ of the reference power source $E_{R2}$ in the control circuit 4 and the voltage $V_D$ for discharging the capacitor $C_2$ while the stabilized output voltage $V_{OS}$ is being provided. That is, by optimally selecting the ratio of the reference voltage $V_{R2}$ and the voltage $V_D$ for discharging the capacitor $C_2$, the overcurrent protection characteristic achievable with the present invention can be made to be such a drooping one as shown at (b) in FIG. 4. Alternatively, by suitably selecting such a ratio, the overcurrent protection characteristic can be made either to be such a so-called fold-back current falling characteristic or leftwardly falling one as shown at (a) in FIG. 4 or to be such a rightwardly falling one as shown at (c) in FIG. 4.

According to the present invention, the operating point for overcurrent detection is determined by the output of the error amplifier 3, and yet the voltage charged at the capacitor $C_2$ in the charge-discharge circuit 5 is made to rise up from zero at the starting point; thus, starting is effected while the output current $I_L$ and transformer driving current are being restrained. In this way, according to the present invention, not only overcurrent protecting function but also "soft start" function is achieved so that the transformer driving transistor and so forth can be effectively protected from damage which tends to be caused at the starting point.

Figure 5:
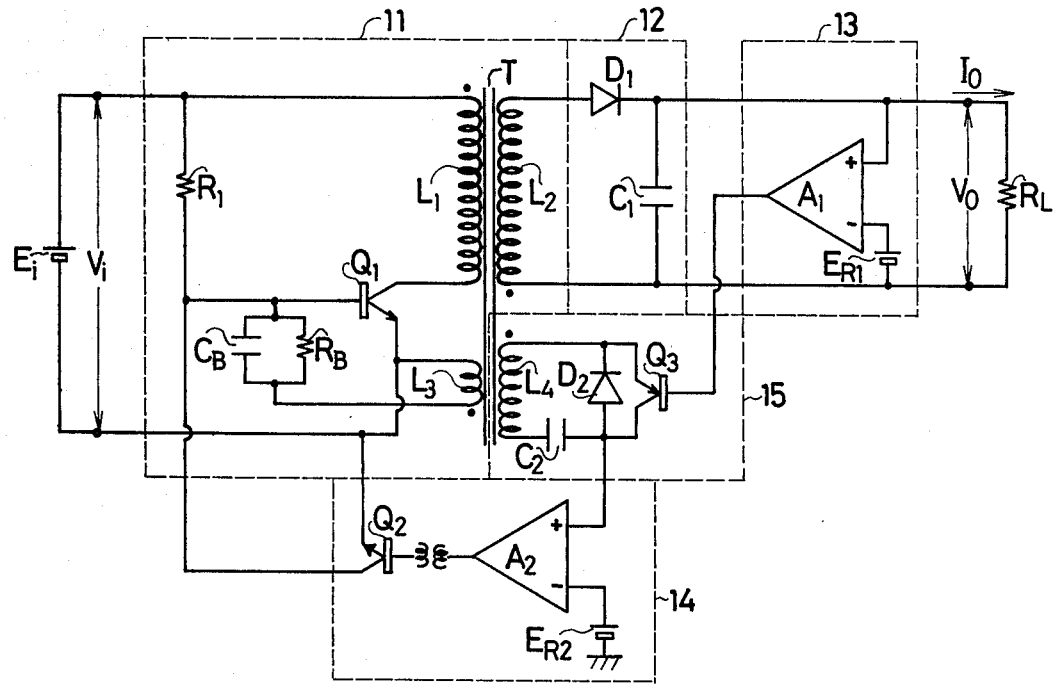
FIG. 5 is a circuit diagram showing a modification to the circuit shown in FIG. 2.

Referring to FIG. 5, there is shown a further switching regulator having the input and output thereof insulated from each other, which is a modification to the circuit shown in FIG. 2. In this switching regulator, there is provided a control circuit 14 comprising an amplifier $A_2$ and a control transistor $Q_2$, wherein an insulation transformer is connected between the amplifier $A_2$ and the base of the control transistor $Q_2$, and there is provided a charge-discharge circuit 15 which includes a control winding $L_4$ provided on a power transformer T, whereby the primary circuit and the secondary circuit of the transformer is insulated from each other. Thus, the capacitor $C_2$ of the charge-discharge cuircuit 15 is charged and discharged with a voltage induced in the control winding $L_4$, and such a voltage is compared with the voltage $V_{R2}$ of a reference power source $E_{R2}$ so that an output is derived from the control circuit 14. Consequently, the oscillation operation of blocking oscillator circuit 11 is controlled by the output of the control circuit 14 so that output voltage $V_O$ obtained across the load $R_L$ can be provided as stabilized output $V_{OS}$.

With the circuit arrangements of FIGS. 2 and 5, no problem will arise while input voltage $V_i$ remains unchanged, but in case the input voltage $V_i$ is changed in an overcurrent state, the overcurrent protection starting point will inevitably be fluctuated. More specifically, if the input voltage $V_i$ is changed, then voltage $V_{L4}$ produced in the control winding $L_4$ of the power transformer T will also be changed when the switching transistor $Q_1$ is turned on. Despite the fact that the time constant defined by the capacitor $C_2$ and resistor $R_2$ in the charge-discharge circuit 5, 15 is invariable, the voltage applied to the CR time-constant circuit is changed; thus, the gradient $dv_{c2}/dt$ of the charging voltage curve of the capacitor $C_2$ depends on the input voltage $V_i$. For this reason, the "on" period $T_{ON}$ of the switching transistor $Q_1$ is reduced as the input voltage $V_i$ builds up, whereas the "on" period $T_{ON}$ of the switching transistor $Q_1$ is increased as the input voltage $V_i$ drops. This acts to restrain the overcurrent operation starting point from being fluctuated with variation in the input voltage $V_i$. However, such an action is insufficient; thus, the overcurrent operation starting point is after all fluctuated with variation in the input voltage $V_i$.

Figure 6:
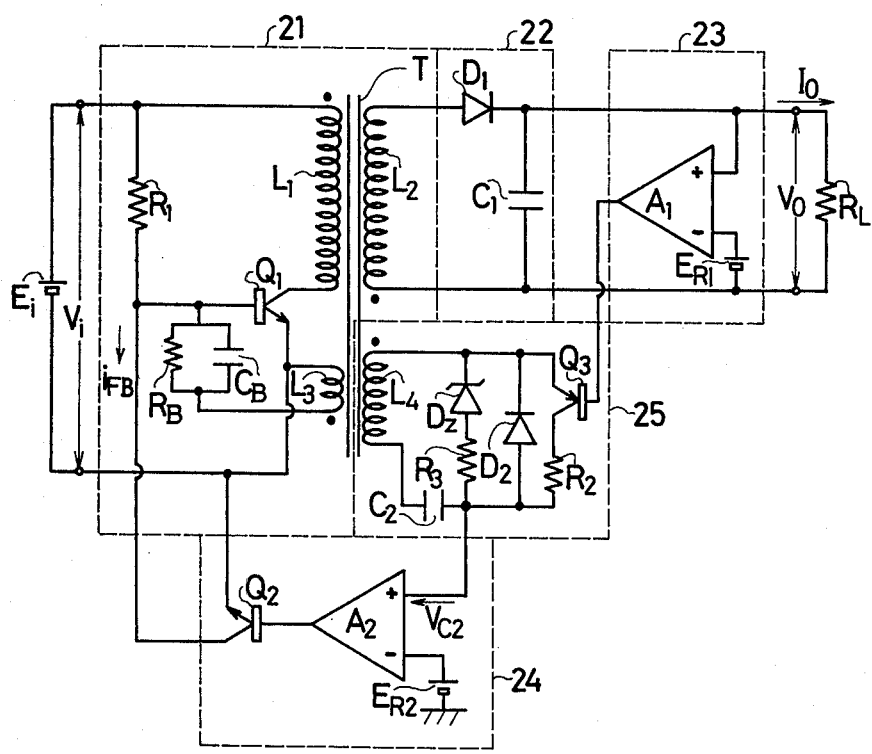
FIG. 6 is a circuit diagram showing the switching regulator according to another embodiment of the present invention.

Referring to FIG. 6, there is shown a still further embodiment of the present invention by which the problems mentioned just above can be solved.

The circuit shown in FIG. 6 comprises an oscillator circuit 21, an output rectifier circuit 22, an error amplifier circuit 23, a control circuit 24 and a charge-discharge circuit 25. The circuit arrangement of FIG. 6 is substantially similar to that of FIG. 5 except for the charge-discharge circuit 25, and therefore description of the other circuits of FIG. 6 than the charge-discharge circuit 25 will be omitted. The charge-discharge circuit 25 includes a first charge circuit comprising the control winding $L_4$ of the power transformer T, the emitter-collector of transistor $Q_3$, resistor $R_2$ and capacitor $C_2$; a second charge circuit comprising the aforementioned control winding $L_4$, Zener diode $D_z$, resistor $R_3$ and capacitor $C_2$; and a third charge circuit comprising the control winding $L_4$, capacitor $C_2$ and diode $D_2$.

The operation of the major circuit portions, except for the charge-discharge circuit 25, of the switching regulator constructed as mentioned above in connection with FIG. 6, is similar to the operation of the switching regulator shown in FIG. 1, and therefore description thereof will be omitted.

In the circuit arrangement of FIG. 6, the switching transistor $Q_1$ of the oscillator circuit 21 is turned on and off so that DC voltage supplied from input power source $E_i$ is chopped to thereby drive the output transformer T, and AC output voltage derived from the power transformer T is rectified and smoothed by means of the output rectifier circuit 22 so that output voltage $V_O$ is obtained across the load $R_L$. Meanwhile, in the error amplifier circuit 23, the output voltage $V_O$ is compared with the reference voltage $V_{R1}$ of the voltage power source $E_{R1}$, and an output corresponding to the deviation of $V_O$ from $V_{R1}$ is fed to the control circuit 24. In the charge-discharge circuit 25, the capacitor $C_2$ is charged, through the resistor $R_2$, with a voltage which is induced in the control winding $L_4$ when the switching transistor $Q_1$ is turned on, and the capacitor is further charged through the Zener diode $D_z$ and resistor $R_3$ when the input voltage $V_i$ exceeds a certain set voltage. The charge-discharge circuit 25 is also designed such that the charged capacitor $C_2$ is discharged, through the diode $D_2$, with a reverse voltage which is induced in the aforementioned control winding $L_4$ when the switching transistor $Q_1$ is turned off. In the control circuit 24, the output of the error amplifier circuit 23 and the output of the charge-discharge circuit 25 are compared with each other, and only when the latter exceeds the former, a control signal for causing the oscillator circuit 21 to be changed from the "on" state to the "off" state is applied to the oscillator circuit 21 to control the "on" period $T_{ON}$ of the switching transistor $Q_1$, whereby the output voltage $V_O$ obtained across the load $R_L$ is stabilized.

Detailed description will next be made of the operation of the charge-discharge circuit 25 which constitutes a feature of the present invention.

When the switching transistor $Q_1$ is turned on, the capacitor $C_2$ is charged with the voltage $V_{L4}$ produced in the control winding $L_4$, through the resistor $R_2$ and depending on the operating resistance of the transistor $Q_3$. At this point, if the voltage $V_{L4}$ produced in the control winding $L_4$ is in excess of the Zener voltage $V_z$ of the Zener diode $D_z$, then the capacitor $C_2$ will be charged with the voltage $V_{L4}$ through the Zener diode $D_z$ and resistor $R_3$. When the voltage charged at the capacitor $C_2$, i.e., the output $V_{C2}$ of the charge-discharge circuit 25 exceeds the voltage $V_{R2}$ of the reference power source $E_{R2}$, the control circuit 24 is enabled to provide a control signal for turning off the switching transistor $Q_1$. When the switching transistor $Q_1$ is turned off, a voltage which is reverse in polarity to the voltage produced when the switching transistor $Q_1$ is turned on, is produced in the control winding $L_4$, and such a reverse induced voltage acts to cause the capacitor $C_2$ to be discharged through the diode $D_2$.

In the circuit of FIG. 6 which operates as mentioned above, as the load $R_L$ becomes heavier, the output $V_{A1}$ of the error amplifier circuit 23 is increased so that the "on" period $T_{ON}$ of the switching transistor $Q_1$ becomes longer, thus resulting in the output voltage $V_O$ being stabilized. However, if an upper limit is set up with respect to the output $V_{A1}$ of the error amplifier circuit 23, then the load $R_L$ becomes so heavy that the output voltage $V_O$ drops, without being stabilized, when the output $V_{A1}$ of the error amplifier circuit 23 reaches the upper limit, whereby operation similar to that of the circuit shown in FIG. 2 is performed to initiate the overcurrent protecting operation.

Figure 7:
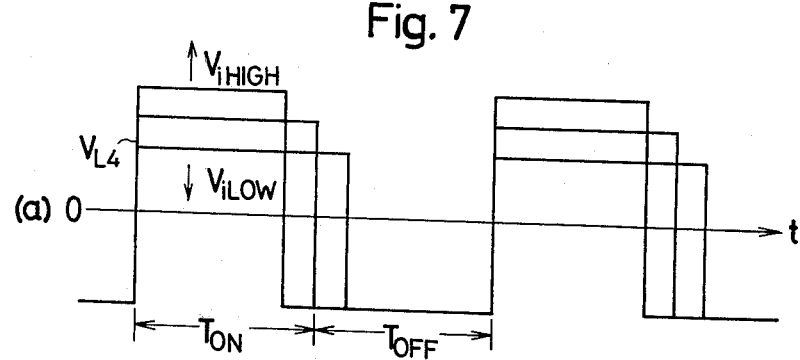
FIG. 7 is a view illustrating the operating voltage and current waveforms which occur in the respective portions of the circuit shown in FIG. 6.
Figure 8:
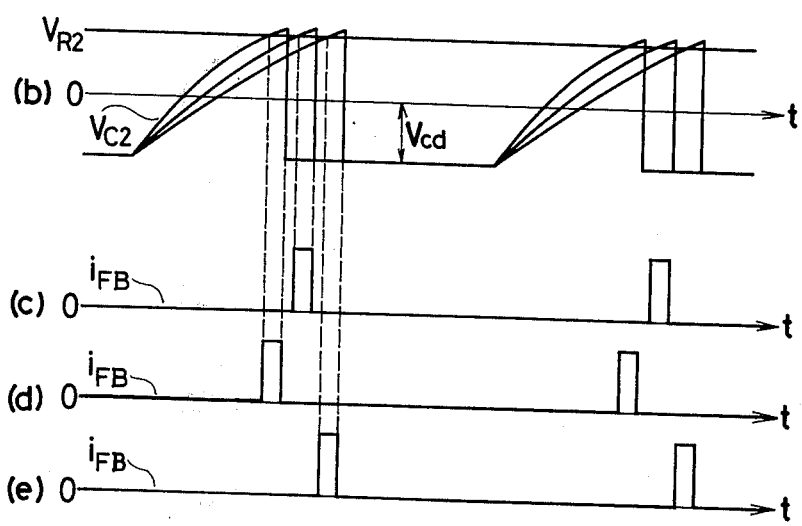
FIG. 8 is a view illustrating the overcurrent protection characteristic of the circuit shown in FIG. 6.
Figure 8:
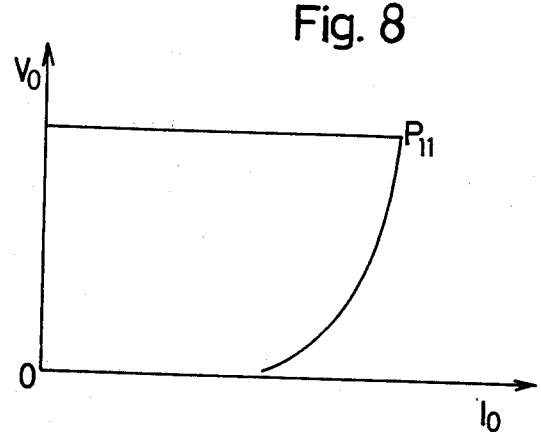

The point of time when the capacitor $C_2$ begins to be charged through the Zener diode $D_z$ and resistor $R_3$ in the charge-discharge circuit 25, is determined depending on the deviation $(V_{L4}-V_z)$ of the voltage $V_{L4}$ produced in the control winding $L_4$ when the switching transistor $Q_1$ is turned on from the Zener voltage $V_z$ of the Zener diode $D_z$. Hence, if the input voltage $V_i$ is varied, then the voltage $V_{L4}$ produced in the control winding $L_4$ when the switching transistor $Q_1$ is also varied as shown in FIG. 7(A), but when the aforementioned voltage $V_{L4}$ reaches the Zener voltage $V_z$ of the Zener diode $D_z$, the charging of the capacitor $C_2$ through the Zener diode $D_z$ and resistor $R_3$ is initiated. The voltage charged at the capacitor $C_2$ builds up as the input voltage $V_i$ increases. For high input voltage $V_i$, the gradient $dv_{c2}/dt$ of the charging voltage curve of the capacitor $C_2$ becomes greater and the point of time when the output $V_{C2}$ of the charge-discharge circuit 25 becomes equal to the maximum value of the output $V_{A1}$ of the error amplifier circuit 23 is reached more quickly than in the case of the conventional switching regulators, whereas for low input voltage $V_i$, such a gradient becomes smaller and the point of time when the output $V_{C2}$ of the charge-discharge circuit 25 beomes equal to the maximum value of the output $V_{A1}$ of the error amplifier circuit 23 is reached more slowly than in the case of the conventional switching regulators. More specifically, when the input voltage $V_i$ is high, the control signal $i_{FB}$ derived from the control circuit 24 turns out to be such a control signal $i_{FB}$ as shown in FIG. 7(d) by which the "on" period of the switching transistor $Q_1$ is reduced, whereas when the input voltage $V_i$ is low, it turns out to be such a control signal $i_{FB}$ as shown in FIG. 7(e) by which the "on" period of the switching transistor $Q_1$ is increased and made to be more dependent on the input voltage $V_i$. Thus, by choosing the Zener diode $D_z$ and resistor $R_3$ with input voltage variations previously taken into consideration, it is possible to keep the overcurrent operation starting point invariable irrespective of such input voltage variations as shown in FIG. 8.

As will be appreciated from the foregoing description, the circuit of FIG. 6 is so designed that the output $V_{C2}$ of the charge-discharge circuit 25 whose charge time constant (CR time constant) varies in dependence on the output $V_{A1}$ of the error amplifier circuit 23, is compared with the voltage $V_{R2}$ of the reference voltage power source $E_{R2}$ available in the control circuit 24, and a control signal by which the switching transistor $Q_1$ of the oscillator circuit 21 is turned off, is derived from the control circuit 24, whereby the output voltage $V_O$ can be stabilized.

According to the embodiment described above in connection with FIG. 6, there is provided a switching regulator whose overcurrent protection characteristic is less influenced by input voltage variations than in the case of the circuits shown in FIGS. 2 and 5 and which is more reliable in operation. Furthermore, according to this embodiment, the overcurrent operation starting point can be made to be invariable; this makes it possible for the circuit of FIG. 6 to use electronic components with a lower maximum rating than in the case of the circuits of FIGS. 2 and 5, thus achieving cost reduction and miniaturization.

Though, in the foregoing, description has been made of the cases where the present invention was applied to self-excitation type switching oscillator circuit, it will be readily appreciated that the present invention is also equally applicable to separate excitation type switching regulators.

According to the present invention, there are provided switching regulators which whatever oscillation system may be employed, is excellent in terms of power conversion efficiency, is capable of providing overcurrent protection without any special overcurrent protection circuit components incorporated therein, and in addition, is able to perform "soft start" function.

What is claimed is:

1. A switching regulator comprising:
   an oscillator circuit for chopping a DC voltage supplied from an input power source to thereby drive a transformer having at least a primary winding, secondary winding and at least one or more additional windings;
   a rectifier circuit for rectifying an AC output voltage derived from said transformer;
   an error amplifier circuit for comparing a DC output voltage derived from said rectifier circuit with a first reference voltage to thereby provide an output corresponding to the deviation of said DC output voltage from said first reference voltage;

a charge-discharge circuit including a capacitor connected to one of said additional windings, said charge-discharge circuit being arranged so that said capacitor is charged with a voltage induced in said one additional winding in such a manner that the polarity of charges stored in said capacitor when the oscillation of said oscillator is in ON state, becomes opposite to the polarity of the charges stored in said capacitor when the oscillation is in OFF state, the discharge time constant of said charge-discharge circuit being variable with the output of said error amplifier circuit; and a control circuit adapted, when the oscillation is in ON state, for comparing the voltage across said capacitor with a second reference voltage and for applying to the base of a switching transistor a trigger signal for causing the oscillation operation to be switched from the ON state to the OFF state only when the voltage across the capacitor exceeds the second reference voltage.

2. A switching regulator according to claim 1, wherein said charge-discharge circuit includes a first charge circuit designed so that the charge time constant of the capacitor thereof is variable with the output of said error amplifier circuit when the oscillation is in ON state; a second charge circuit designed so that a current to be charged at the capacitor thereof is caused to flow when the voltage induced in said one additional winding in proportion to the DC voltage supplied from the input power source, exceeds a predetermined voltage; and a third charge circuit designed so that when the oscillation is in OFF state, the capacitor thereof is discharged so as to be charged in a polarity opposite to that of the charges stored in the capacitor when the oscillation is in ON state.

* * * * *